(12) United States Patent
Arlotti et al.

(10) Patent No.: US 8,991,211 B1
(45) Date of Patent: Mar. 31, 2015

(54) THREE-DIMENSIONAL PRINTING GLASS ARTICLES

(75) Inventors: John C. Arlotti, Cheswick, PA (US); Paul Knor, Ruffsdale, PA (US)

(73) Assignee: The ExOne Company, North Huntingdon, PA (US)

( * ) Notice: Subject to any disclaimer, the term of this patent is extended or adjusted under 35 U.S.C. 154(b) by 266 days.

(21) Appl. No.: 12/925,812

(22) Filed: Oct. 29, 2010

Related U.S. Application Data

(60) Provisional application No. 61/257,009, filed on Nov. 1, 2009.

(51) Int. Cl.
*C03B 19/09* (2006.01)
*C03B 19/01* (2006.01)
*C03B 19/06* (2006.01)

(52) U.S. Cl.
CPC .............. *C03B 19/01* (2013.01); *C03B 19/06* (2013.01); *C03B 19/09* (2013.01)
USPC ............. 65/17.3; 427/212; 427/220; 427/226

(58) Field of Classification Search
USPC ..................... 264/632, 635, 671–673; 65/17.3
See application file for complete search history.

(56) References Cited

U.S. PATENT DOCUMENTS

| | | | | |
|---|---|---|---|---|
| 1,636,282 | A * | 7/1927 | Boelcke | 264/629 |
| 4,209,478 | A * | 6/1980 | Wooten et al. | 264/671 |
| 4,849,001 | A | 7/1989 | Drake et al. | |
| 5,204,055 | A * | 4/1993 | Sachs et al. | 419/2 |
| 5,340,656 | A * | 8/1994 | Sachs et al. | 428/546 |
| 5,798,469 | A * | 8/1998 | Nufer | 75/246 |
| 6,106,747 | A * | 8/2000 | Wohlwend | 264/16 |
| 6,376,148 | B1 * | 4/2002 | Liu et al. | 430/124.4 |
| 6,403,002 | B1 * | 6/2002 | van der Geest | 264/113 |
| 6,531,191 | B1 | 3/2003 | Notenboom | |
| 6,596,224 | B1 | 7/2003 | Sachs et al. | |
| 6,742,456 | B1 | 6/2004 | Kasperchik et al. | |
| 6,764,619 | B2 * | 7/2004 | Bernas et al. | 264/1.21 |
| 6,780,368 | B2 * | 8/2004 | Liu et al. | 264/401 |
| 7,422,713 | B2 | 9/2008 | Oriakhi et al. | |
| 8,196,640 | B1 * | 6/2012 | Paulus et al. | 164/34 |
| 2001/0031334 | A1 | 10/2001 | Katsuda et al. | |

(Continued)

FOREIGN PATENT DOCUMENTS

| | | |
|---|---|---|
| EP | 1415792 A2 | 5/2004 |
| EP | 1512519 A3 | 7/2008 |
| WO | WO9630195 A1 | 10/1996 |

OTHER PUBLICATIONS

Glass 3DP-10/27 (M. Trainor, http://open3dp.me.washington.edu/2009/10/printing-ceramic-on-youtube/ dated Oct. 27, 2009.*

(Continued)

*Primary Examiner* — Jason L Lazorcik
(74) *Attorney, Agent, or Firm* — Thomas Lizzi

(57) ABSTRACT

Methods for producing glass articles of a wide range of geometrical shapes, including shapes that are heretofore difficult or impossible to make monolithically. The glass articles are made by first building the nascent glass article from glass powder and a binder using a three-dimensional printing freeform fabrication process followed by sintering the nascent glass article at a temperature that is hundreds of degrees above the glass powder composition's glass transition temperature while supporting the nascent glass article in a bed of an inert powder having a high flowability.

5 Claims, 6 Drawing Sheets

(56) References Cited

U.S. PATENT DOCUMENTS

| | | | |
|---|---|---|---|
| 2002/0145213 A1* | 10/2002 | Liu et al. ............ | 264/40.1 |
| 2005/0049739 A1 | 3/2005 | Kramer et al. | |
| 2006/0208388 A1 | 9/2006 | Bredt et al. | |
| 2009/0209674 A1 | 8/2009 | Ito et al. | |
| 2009/0260397 A1* | 10/2009 | Cornejo et al. ............ | 65/17.6 |
| 2011/0129640 A1* | 6/2011 | Beall et al. ............ | 428/116 |
| 2014/0196360 A1* | 7/2014 | Sarkar ............ | 44/457 |

OTHER PUBLICATIONS

Glass3DP-09/29 (Author unknown, http:open3dp.me.washington.edu/2009/Glass-3dp/—Dated Sep. 29, 2009).*

Glass3DP-10/20 (Author unknown, http://open3dp.me.washington.edu/2009/10/translucent-glass-results/—Dated Oct. 20, 2009)Glass3DP-10/26 (Author unknown, http://open3dp.me.washington.edu/2009/10/hyperboloid-fun/—Dated Oct. 26, 2009).*

Nammour, Daniel E, "Fabricatoin of glass-ceramic comonents via three dimensional printing", Thesis (M.S.)—Massachusetts Institute of technology, Dept. of materials Science and Engineering, Sep. 1995.*

Cima et. al., "Structural Ceramic Components by 3D Printing", Solid Freeform Fabrication Proceedings, 1995, pp. 479-488.*

Hickey, H., "UW Lab Demonstrates 3-D Printing in Glass", uwnews.org—Sep. 24, 2009 (https://web.archive.org/web/20091002192834/http://uwnews.org/article.asp?articleID=52160).*

Shapeways Blog (http://www.shapeways.com/blog/archives/401-you-can-now-3D-print-in-glass-with-Shapeways.html); Apr. 14, 2010.*

"Shapeways: 3D Printing Glass"—Youtube video (https://www.youtube.com/watch?v=BtK-Hqd6Q2l) Uploaded on Mar 30, 2010.*

William D. Scott, Refractory Molds for Glass Sintering (Final Report), Report No. GL-95-1, Clean Washington Center, Seattle, WA, Dec. 1995.

NIST MEP Environmental Program, Technology Brief: Densification, Crystallization, and Sticking Behavior of Crushed Waste Glass Sintered in Refractory Molds with Release Agents, #GL-002, Seattle, WA, Jan. 2000.

NIST MEP Environmental Program, Technology Brief: Refractory Molds for Glass Sintering, #GL-95-1, Seattle, WA, Dec. 1995.

Potters Industries Inc., Use of Spheriglass Solid Glass Spheres in Epoxy Castings, Valley Forge, PA, (undated).

Potters Europe, Potters Spheriglass 2530 Solid Glass Spheres—Technical Specifications: High Performance Additives for Polymers offering unique advantages when used as additives in thermoplastic and thermoset polymer systems, Suffolk, UK, (undated).

Saint-Gobain Zirpro, Zirblast Ceramic Beads, Le Pontet Cedex, France, (undated).

Saint-Gobain Zirpro, Zirshot Safety Data Sheet n0: DS MS BD 11 GB, Le Pontet Cedex, France, Jul. 6, 2000.

Potters Industries Inc., Spheriglass Solid Glass Spheres: E Glass, downloaded Oct. 22, 2009 from http//:www.pottersbeads.com/markets/PolySpheriglassESpecs.asp, dated 2001.

Potters Industries Inc., Spheriglass Solid Glass Spheres: A Glass, downloaded Oct. 22, 2009 from http//:www.pottersbeads.com/markets/PolySpheriglassASpecs.asp, dated 2001.

Potters Industries Inc., Potters Industries Sphericel 110P8 Hollow Glass Spheres, downloaded Oct. 22, 2009 from http//:matweb.com/search/datasheet_print.aspx?matguid+288b . . . .

Univ. of Washington, University Lab Demonstrates 3-D printing in glass, downloaded Oct. 21, 2009 from http://www.physorg.com/news17302260.html, dated Sep. 24, 2009.

Author unknown, Glass 3DP . . . , downloaded Oct. 21, 2009 from http://open3dp.me.washington.edu/?p=20, Sep. 29, 2009.

RAPIDTODAY, Glass 3D Printer, downloaded Oct. 21, 2009 from http://www.rapidtoday.com/forums/viewtopic.php?f=14&t=126, Feb. 11, 2009.

Ponoko, 3D Printing in Glass, downloaded Oct. 21, 2009 from http://www.facebook.com/note/php?note_id=144284352546, Sep. 28, 2009.

The Engineer, 3D glassjet printer, downloaded Oct. 21, 2009 from http://theengineer.co.uk/Articles/Article.aspx?liArticleID=310039, Feb. 11, 2009.

Potters Industries Inc., Spheriglass Solid Glass Microspheres Reduce Manufacturing Costs and Offer Greatly Improved Physical Properties, downloaded Oct. 22, 2009 from http://news.thomasnet.com/companystory/473083, Jan. 12, 2006.

Mansoil (Preforms) Ltd., Sintered Glass Preforms, downloaded Oct. 21, 2009 from http://www.mansol-preforms.com/default.asp?MIS=12, (undated).

Warmglass.com, 3D printing with glass, downloaded Oct. 21, 2009 from http://www.warmglass.com/phpBB/viewtopic.php?f=2&p=296537, Oct. 12, 2009.

Kish Co. Inc., Technical Data Sheet: Spheriglass Fine Solid Glass Spheres, Mentor, OH, Apr. 25, 2003.

MO-SCI Specialty Products, LLC, GL-0191 Data Sheet, Rolla, MO, (undated).

Jaygo Inc., Dragonite Soda Lime Glass Beads, Union, NJ, (undated).

* cited by examiner

THREE-DIMENSIONAL PRINTING GLASS ARTICLES

CROSS-REFERENCE TO RELATED APPLICATION

The present application claims the benefit of Provisional Patent Application Ser. No. 61/257,009, which was filed on Nov. 1, 2009 and incorporates that application in its entirety herein by reference.

FIELD OF THE INVENTION

The invention relates to methods of producing glass articles by three-dimensional printing.

BACKGROUND OF THE INVENTION

Glass articles are usually made by forming molten glass into the desired shapes. It is also known to make glass articles by casting a mixture of glass powder, with or without a binder, into a mold and then heating the mold to sinter the glass powder. An example of a conventional glass powder casting method is described in U.S. Pat. No. 4,849,001 to Drake et al. which claims sintering water-soluble glass powder at a temperature that is in the range of ~10 to +25° C. of its glass softening temperature, $T_s$. However, both of the aforementioned methods have process limitations that restrict the geometric shapes of the articles that may be manufactured monolithically, i.e., without fusing or gluing together two or more component parts.

It is also known to make glass articles from glass powder by three-dimensional printing techniques. For example, U.S. Patent Application Publication No. US 2006/0208388 A1 of Bredt et al. describes the making of glass articles consisting of glass powder bonded together by polymer. U.S. Pat. No. 7,422,713 B2 to Oriakhi et al. describes a similar way to make glass articles consisting of glass beads bonded together by a hydrated cement. Recent reports on the Internet from the University of Washington describe the use of what they call their "Vitraglyphic process" to create glass objects using a conventional 3-D printer and then heating to sinter the glass powder to result in fired glass objects that are light and quite porous, such that they are essentially glass sponges. See http://www.physorg.com/news173022660.html (visited Oct. 21, 2009) and http://open3dp.me.washington.edu/?p=20 (visited Oct. 21, 2009). The problem with these methods, however, is that they do not result in useful glass articles having near full density.

SUMMARY OF THE INVENTION

The present invention provides a novel method for producing near fully dense glass articles of a wide range of geometrical shapes, including shapes that are heretofore difficult or impossible to make monolithically. The inventors of the present invention have made the surprising discovery that such glass articles can be made by first building the nascent glass article from glass powder and a binder using a three-dimensional printing free-form fabrication process followed by sintering the nascent glass article at a temperature that is hundreds of degrees above the glass powder composition's glass transition temperature while supporting the nascent glass article in a bed of an inert powder having a high flowability.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

DESCRIPTION OF PREFERRED EMBODIMENTS

Figure 1:
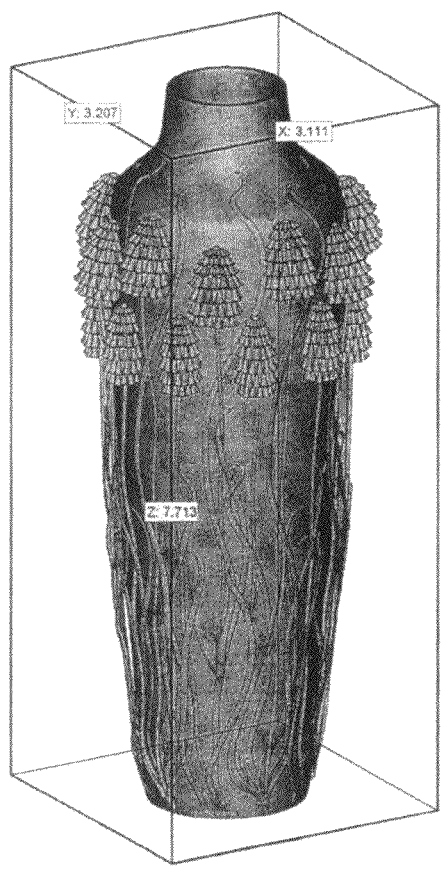
FIG. 1 is computer representation of a glass vase in accordance with an embodiment of the present invention.

In this section, some preferred embodiments of the present invention are described in detail sufficient for one skilled in the art to practice the present invention. It is to be understood, however, that the fact that a limited number of preferred embodiments are described herein does not in any way limit the scope of the present invention as set forth in the appended claims.

Embodiments of the present invention utilize a three-dimensional printing free-form fabrication step followed by sintering to create glass articles from glass powder. A general description of a process according to an embodiment of the invention is as follows. First, a computer representation is created of the article that is to be made. This representation is used to build the article as a series of vertically-stacked layers. Next, a layer of glass powder is spread atop a vertically-indexable table. Then a binder fluid is applied to the glass powder layer in a pattern that corresponds to the first layer of the computer representation of the article. Another layer of glass powder is spread across the top of the first glass powder layer, and the binder fluid is applied to this second layer in a pattern that corresponds to the second layer of the computer representation of the article. The sequence of steps is continued until a pattern corresponding to the topmost layer of the computer representation of the article has been applied to a glass powder layer. The result of this process is a powder bed containing a nascent glass article in the form of binder-bonded glass powder. This powder bed is heated to drive off what remains of the carrier portion of the binder fluid and to cure the binder. After the powder bed has cooled sufficiently to permit handling, the nascent article is removed from the powder bed and loose glass powder is cleaned away from it, especially from internal passages. Next, a layer of a flowable, inert powder is formed on a substrate and the nascent article is placed upon the inert powder. Containment walls are supplied around the nascent article and additional inert powder is provided to form a bed of the inert powder around the nascent article. The purpose of the inert powder bed is to provide structural support to the nascent article to avoid sagging during the sintering heat treatment. In cases where the nascent article has internal features, e.g., hollow sections, they should be filled with the inert powder if there is a chance of undesired sagging occurring during the sintering heat treatment that would distort those features. The inert powder bed supporting the nascent article is then heated to a preselected temperature to sinter the glass powder thus transforming the nascent article into a sintered glass article. The inert powder bed is then cooled slowly to avoid thermal shock cracking of the glass article and to reduce thermal gradients so as to reduce the potential for entrapped stresses during solidification, and then the glass article is removed from the inert powder bed. The glass article may be subjected to additional treatments, such as glazing or enameling treatments, as desired.

Any type of glass powder known to persons skilled in the art may be used in accordance with the present invention, so long as it is amenable to spreading uniformly enough for three-dimensional printing and is sinterable. Preferably, the glass powder has a soda lime glass or borosilicate glass composition. In some embodiments of the present invention, small amounts of additives to change the color, texture, transparency, and/or luster of the glass article are blended into the glass powder or the binder fluid prior the three-dimensional printing step. Such additives include metal oxides for coloration such as cobalt oxide for blue and gold chloride for red, reduction of transparency through deliberate devitrification with the use of oxides such as $B_2O_3$, $ZrO_2$ and $TiO_2$, as well as various sintering aids in the form of fine (low $T_g$) glass powders and various other chemical additives known to promote glass formation, such as $B_2O_3$, $Na_2Si_2O_5$, and $Na_2SiO_3$. The size, shape, and amount of such additives are chosen to provide the desired effects the additives are to have on the glass article while being compatible with the three-dimensional printing and sintering steps of the present invention.

The glass powder used in the present invention may have any shape that permits it to be used in the three-dimensional printing step, but preferably is substantially spherical to promote spreadability. The glass powder should have a particle size (as measured by the laser diffraction method) that is in the range of 0-150 micrometers, with an average particle size that is in the range of 20-100 micrometers. More preferably, the particle size should be in the range of 20-100 micrometers and the average particle size should be in the range of 25-55 micrometers. The glass powder particles may be solid or hollow, as desired.

In the practice of the present invention, the surface of the glass powder may be coated or uncoated prior to use in the three-dimensional printing step. In embodiments using coated powder, the coating comprises an agent that will react with the binder fluid to bind the glass powder particles together. Examples of such coatings include starches, sugars, and various polymers.

Any type of binder fluid known to persons skilled in the art that is amenable with both the glass powder (including any additives and coatings) and the three-dimensional printing process may be used in accordance with the present invention. Preferably, the binder fluid comprises a binder agent and a carrier fluid. The binder fluid may also include additives to alter the color, texture, transparency, and/or luster of the glass article, as mentioned above. The binder agent may be suspended and/or dissolved in the carrier fluid. Preferably, the carrier fluid is water or an organic solvent. In embodiments of the present invention in which coated powder is used, the binder fluid reacts with the coating on the glass powder to bond the glass particles together. In such embodiments, the binder fluid preferably does not include a binder agent, although in some such embodiments the binder fluid may include a binder agent that assists in the glass particle bonding.

In many embodiments of the present invention, the nascent article and the powder bed that are formed during the three-dimensional printing step are heated in an oven or similar apparatus at a temperature and time combination which is sufficient to drive off the remaining carrier fluid and/or to otherwise enhance the interparticle bonding within the nascent article. In other embodiments, especially those in which energy is applied to the powder bed after the printing of each layer to drive off the remaining carrier fluid and/or to otherwise enhance the interparticle bonding within the nascent article, the oven treatment step may be modified accordingly or even omitted.

The composition of the inert powder that is used in the methods of the present invention to support the nascent article is chosen to avoid a chemical reaction between the inert powder and the nascent article during the sintering step. It is preferred that the thermal expansion coefficients of the glass powder and inert powder compositions be similar so as to minimize the thermal stresses on the nascent article during heating and on the sintered article during cooling. Examples of inert powder compositions include phlogopite mica, muscovite mica, boron nitride, alumina and zirconia, as well as glass ceramic beads comprised of primarily zirconia or alumina fused within a silica matrix. Preferably, the inert powder composition is selected from the group consisting of zirconia and zirconia silicates with high concentrations of zirconia.

The inert powder is also selected to have sufficient flowability to accommodate movement of the nascent article due to shrinkage as it is heated and sintered so as to avoid dimensional distortion of the nascent article due to sagging. The inert powder must also have sufficient flowability to accommodate the shrinkage of the sintered article as it is cooled back to room temperature. It is especially important that the inert powder be able to flow out of the internal cavities and/or passages during sintering and cooling so as to eliminate or minimize distortions and/or cracking that otherwise could occur due to cavities and/or passages shrinking around trapped inert powder. To enhance flowability, the inert powder preferably has a spherical or near-spherical shape and its particles have smooth surfaces. Small particle sizes should be avoided for the inert powder so as to minimize the inert powder's sinterability and reactivity. The inert powder should have a particle size (as measured by the sieve analysis method) that is in the range of 0-200 micrometers, with an average particle size that is in the range of 20-150 micrometers. More preferably, the particle size should be in the range of 20-125 micrometers, and the average particle size in the range of 50-100 micrometers.

The sintering temperatures and times used in embodiments of the present invention are chosen to achieve the desired amount of sintering of the glass powder comprising the nascent article. In contrast to suggestions in the prior art that glass powder be sintered at temperatures very near to its glass transition temperature, the inventors of the present invention made the surprising discovery that good sintering is achieved without significant geometric distortion by way of the present invention by using sintering temperatures in the range of 250 to 350° C. above the glass transition temperature of the glass powder, where the glass transition temperature is determined by the dilatometry method. The time at sintering temperature is selected to achieve the desired amount of densification, which may range from about 92 to about 98 percent on an apparent density basis.

The present invention may be used to make glass articles having geometries ranging from those which can be made by conventional glass making methods to those which cannot be made monolithically by another method. Examples of some geometries of the latter type are shown in FIGS. 1-8.

EXAMPLES

Example 1

A glass vase was produced in accordance with an embodiment of the present invention in the following manner. All processing was done in an air atmosphere.

The representation of a vase shown in FIG. 1 was printed on a Prometal R2 printing platform, available from Prometal, LLC, of Irwin, Pa., US, 15642, having a 200 millimeter by 200 millimeter by 150 millimeter deep build box, using Spheriglass® 3000A powder, available from Potters Industry, Inc. of Valley Forge, Pa., US, 19482-040. This powder is a soda lime glass in the form of spherical particles with an average particle size of 35 micrometers, and having a glass transition temperature of approximately 730° C. As depicted in FIG. 1, the vase was circumscribed by a rectangular box having a height of 7.713 inches, a width of 3.111 inches, and a depth of 3.207 inches.

The vase was printed in 100 micron layers with the long axis oriented along the machine's print axis, using S-Binder version 4, from Prometal, LLC, of Irwin, Pa., US, 15642. After the printing was completed, the build box containing the nascent article and the glass powder bed was removed from the machine and placed into a curing oven.

A thermocouple was inserted in the loose powder within the build box and the temperature of the oven was increased at a rate of 5° C./min until the temperature of the powder reached 200° C. After curing six hours at this temperature, the box was cooled and then placed in a de-powdering station to remove all loose powder from inside and around the part. The de-powdering device enables the operator to incrementally raise the build platen in the box upward, exposing the nascent article, while allowing the operator to simultaneously remove the loose powder through the use of a combination of a vacuum and compressed air.

Figure 2:
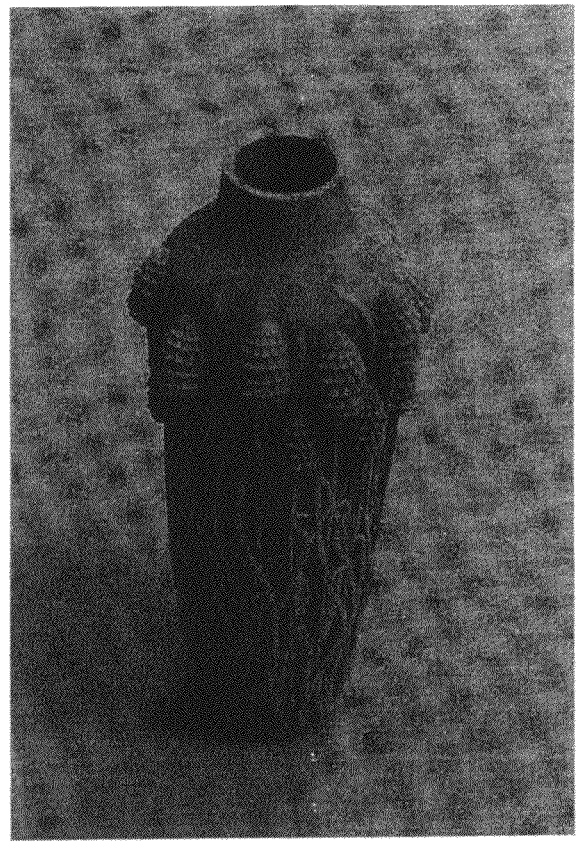
FIG. 2 is a photograph of a nascent glass vase produced from the representation shown in FIG. 1 after it has been three-dimensionally printed and cured in accordance with an embodiment of the present invention.

The nascent article, shown in FIG. 2, was then placed on a bed of ceramic support media within a porous alumina tray, and after placing a tube of dense alumina on top of the porous tray and around the part, the nascent article was completely buried in the support media. The support media used was a spherical blast media, Zirblast B120, available from Saint-Gobain Zirpro, Le Pontet Cedex, France, which is comprised of a 68% crystalline zirconia phase fused with an amorphous silica phase, and particle sizes ranging from 70-125 microns.

Figure 3:
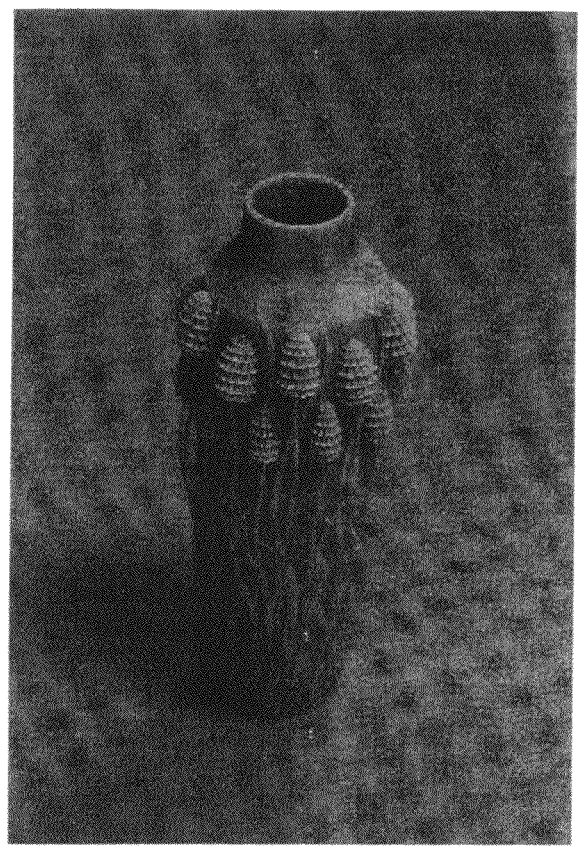
FIG. 3 is a photograph of the glass vase of FIG. 2 after it has been sintered in accordance with an embodiment of the present invention.
Figure 4:
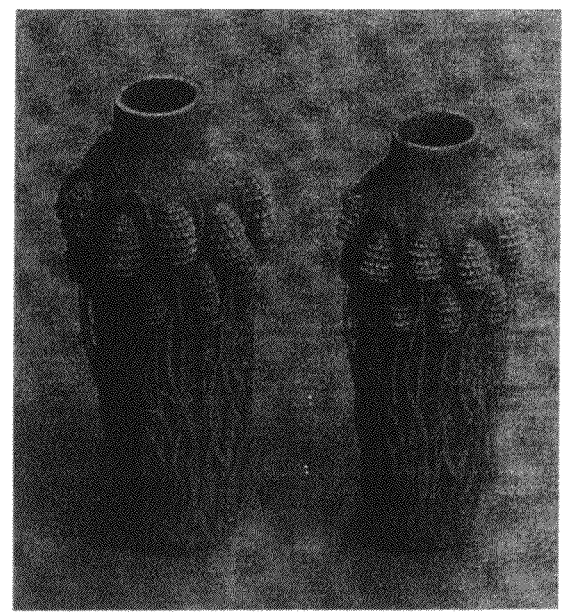
FIG. 4 is a photograph comparing the nascent glass vase of FIG. 2 with the sintered glass vase of FIG. 3.
Figure 5:
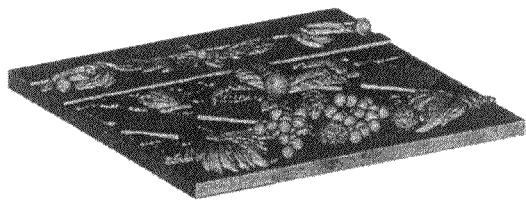
FIG. 5 shows two computer representations of a glass grape vine tile in accordance with an embodiment of the present invention.
Figure 5:
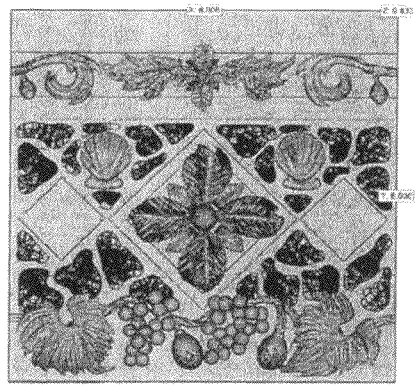
Figure 6:
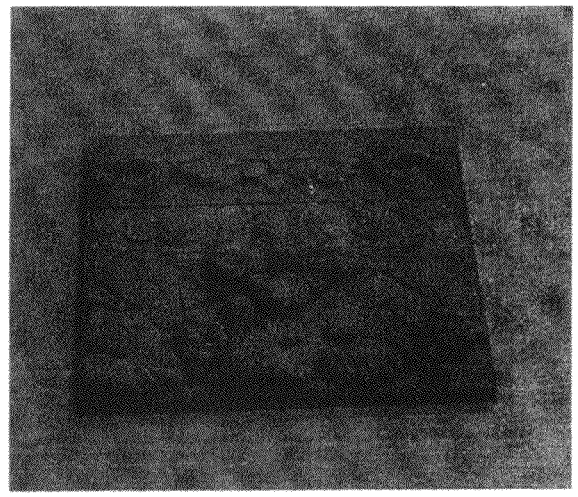
FIG. 6 is a photograph of a nascent glass grape vine tile produced from the representations shown in FIG. 5 after it has been three-dimensionally printed and cured in accordance with an embodiment of the present invention.
Figure 7:
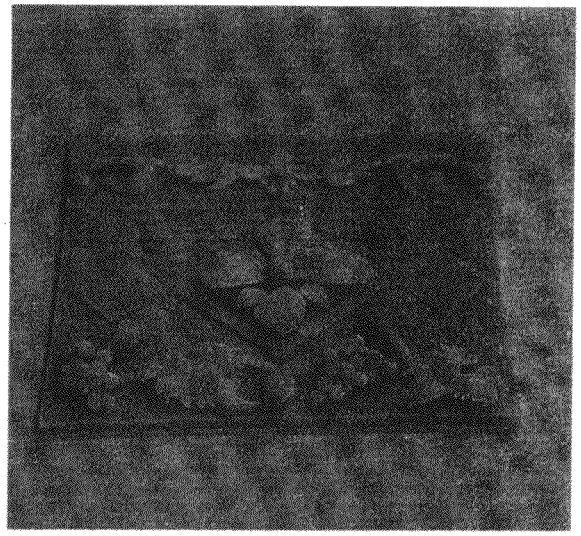
FIG. 7 is a photograph of the nascent glass grape vine tile of FIG. 6 after it has been sintered in accordance with an embodiment of the present invention.
Figure 8:
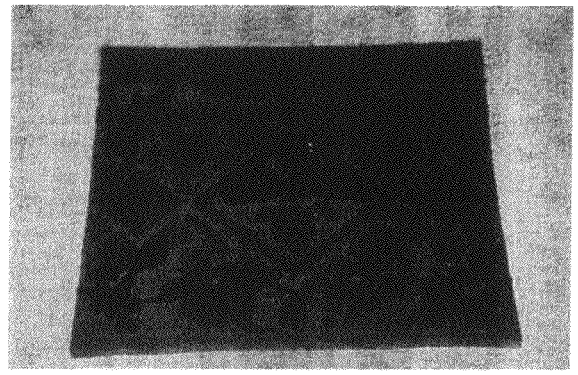
FIG. 8 is a photograph of the sintered glass grape vine tile of FIG. 7 displayed upon a light table.
Figure 9:
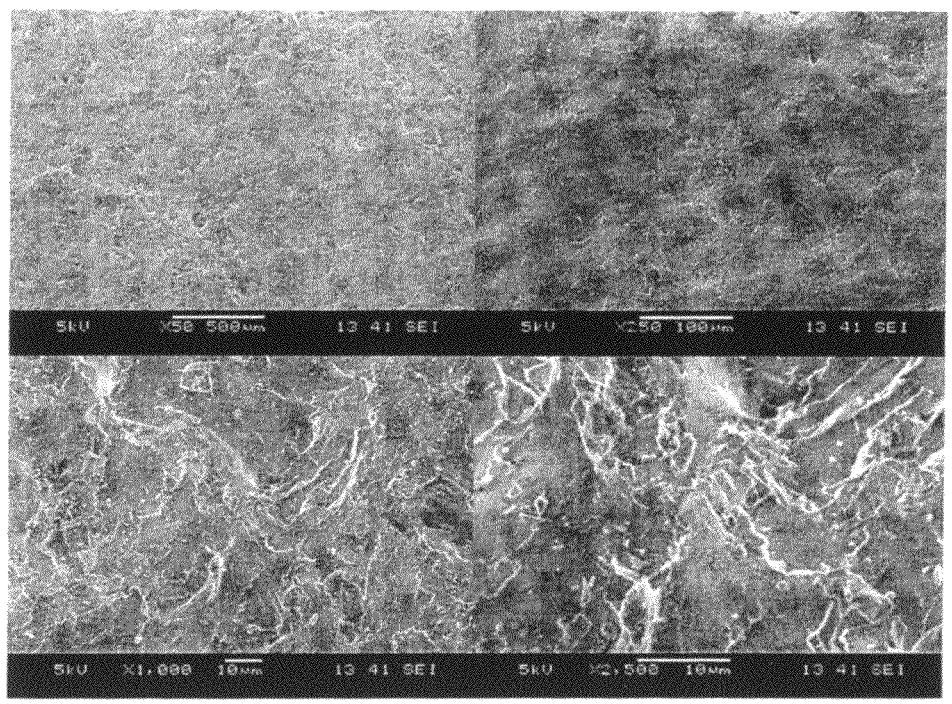
FIG. 9 shows four scanning electron microscope (SEM) images of the surface of the sintered glass grape vine tile of FIG. 8.

The nascent article, thus supported, was placed in an IsoTemp Muffle furnace and heated in air according to the following thermal profile:

Heat to 400° C. at a rate of 5° C./min;
Hold at 400° C. for 3 hours;
Heat to 600° C. at a rate of 10° C./min;
Hold at 600° C. for 3 hours;
Heat to 1000° C. at a rate of 10° C./min;
Hold at 1000° C. for 3 hours;
Cool to 550° C. at a rate of 25° C./min;
Cool to 525° C. at a rate of 0.5° C./min;
Hold at 525° C. for 30 minutes
Cool to 500° C. at a rate of 0.3° C./min
Hold at 500° C. for 30 minutes
Cool to 50° C. at a rate of 10° C./min After the cycle was complete, the arrangement was removed from the oven and set on a table and allowed to cool to room temperature. Once cool, the alumina tube was pulled upward slowly, allowing the support media to flow away exposing the part. Once the part was removed from the arrangement and all loose powder was poured out from the inside, the part was placed in a blasting cabinet where it was cleaned by lightly blasting with the same Zirblast B120 beads that the part had been supported with during the sintering operation. The sintered vase, shown in FIGS. 3 and 4, is approximately 20% smaller than the original printed and cured part, which is due to densification from a solid density of approximately 60%, to a near fully dense article.

Example 2

The process described in Example 1 was used to make the glass "grape vine" tile that is depicted in FIGS. 5-9.

The tile "template" on which all features are affixed has an original print size of 6 inches by 6 inches by ¼ inches, and a final sintered size of 5.8 inches by 5.8 inches by 0.19 inches. Calculation of the percent change of these resultant volumes indicates the final part size is 71% of the original part volume. This dimensional data, coupled with the translucency shown in FIG. 8, as well as the SEM micrographs shown in FIG. 9 (which show that there is negligible residual porosity on the surface of the parts), indicate the glass grape vine tile was near full density.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

What is claimed is:

1. A method for making a sintered glass article comprising the steps of:
    a) providing a soda lime glass powder;
    b) three-dimensionally printing a nascent glass article by selectively applying a fluid to the glass powder;
    c) supporting the nascent glass article in a bed of flowable inert powder;
    d) maintaining the nascent glass article at 1000° C. to form a sintered glass article; and
    e) cooling the sintered glass article to room temperature.

2. The claim of method 1, wherein the glass powder has a spherical shape.

3. The claim of method 1, wherein the nascent glass article has an internal cavity and step (c) includes filling the internal cavity with the inert powder.

4. The claim of method 1, wherein the inert powder has a spherical shape.

5. The method of claim 1, wherein the sintered glass article is near full density.

* * * * *